Figure 3:
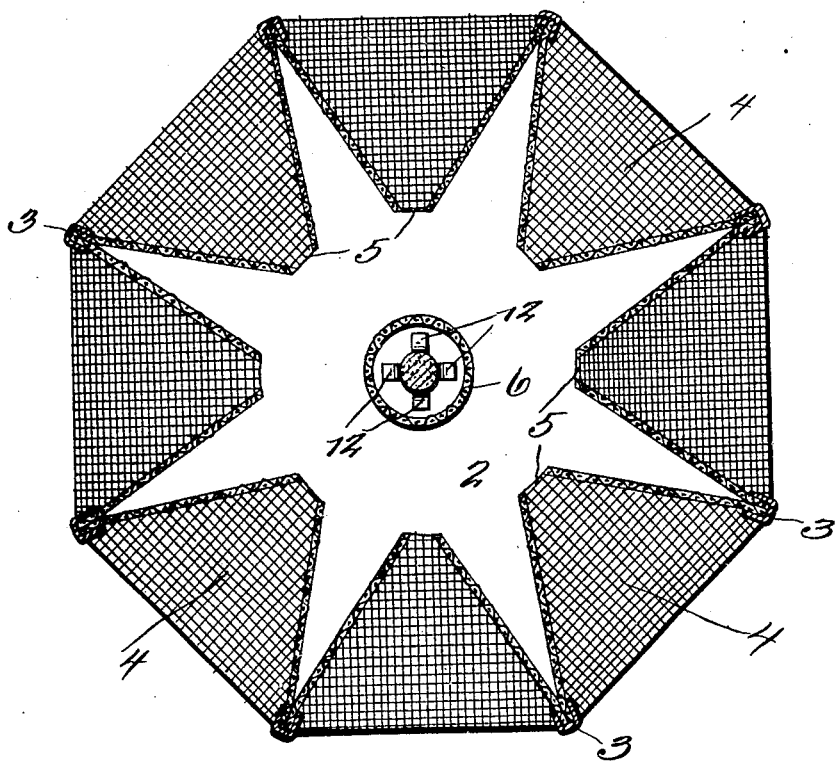

No. 869,556. PATENTED OCT. 29, 1907.
J. E. DE HAAS.
INSECT TRAP.
APPLICATION FILED MAY 18, 1907.
2 SHEETS—SHEET 1.
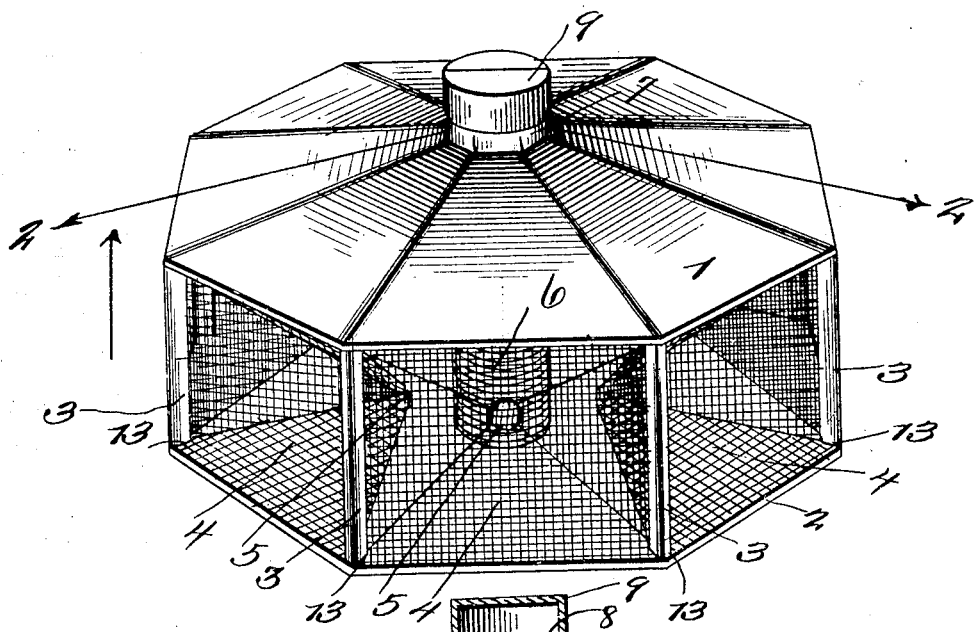
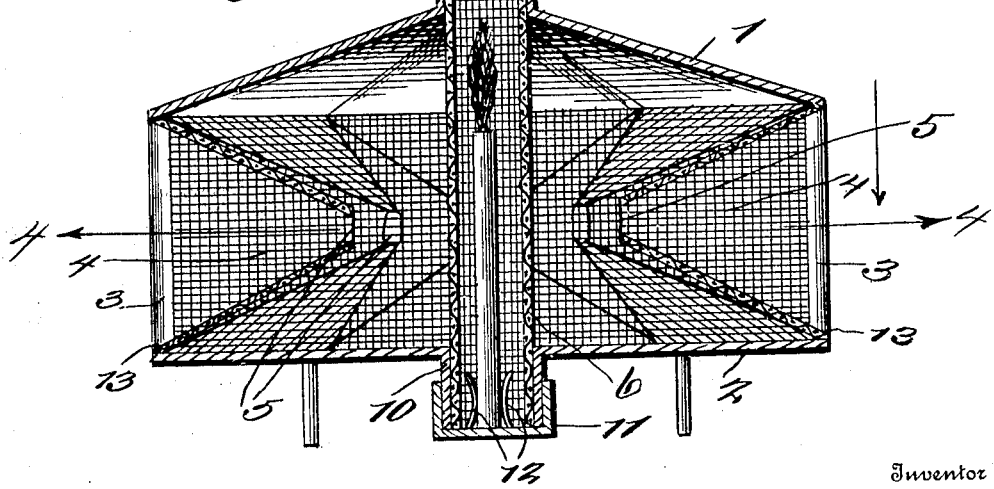
Witnesses
R. A. Boswell
K. G. Whitcomb
Inventor
J. E. De Haas,
By Dean Swift
Attorney No. 869,556.

PATENTED OCT. 29, 1907.

J. E. DE HAAS.
INSECT TRAP.
APPLICATION FILED MAY 18, 1907.

2 SHEETS—SHEET 2.

Witnesses

Inventor
J. E. De Haas.
By Dean Swift Attorney

UNITED STATES PATENT OFFICE.

JAMES E. DE HAAS, OF ENID, OKLAHOMA TERRITORY.

INSECT-TRAP.

No. 869,556.  Specification of Letters Patent.  Patented Oct. 29, 1907.

Application filed May 18, 1907. Serial No. 374,413.

*To all whom it may concern:*

Be it known that I, JAMES E. DE HAAS, a citizen of the United States, residing at Enid, in the county of Garfield and Territory of Oklahoma, have invented a certain new and useful Insect-Trap, of which the following is a specification, reference being had therein to the accompanying drawing.

The invention relates to an insect trap, designed for the purpose of trapping all insects that are attracted by a light.

The principal object of the invention is to provide a simple and inexpensive device of this character which may be placed in a garden, or a field of crop, for the purpose of attracting after dark, such insects as frequent such places.

With these and other objects, the invention comprises further combinations of parts and features, which will be hereinafter described, claimed, and shown in the accompanying drawings, in which, Figure 1 is a perspective view of the device, illustrating the features of the invention. Fig. 2 is a sectional view on line 2—2 of Fig. 1. Fig. 3 is a sectional view, taken on line 4—4 of Fig. 2.

Referring specifically to the accompanying drawings, 1 and 2 designate an upper and lower plate of the device, the upper one being slightly pyramidal, so that when the device is turned over the insects that have been trapped will fall from the inside of the trap. These plates are joined together by stays 3, and between the stays are fixed entrances 4 which are in the form of a pyramid. These entrances are provided with openings as at 5, through which the insects may enter the trap, when attracted by the light. Also, connecting the upper and lower plates is a casing of meshed work 6 in which a light may be fixed as will be clearly understood. This casing may be removed entirely, if desired, but at times it need only be removed sufficiently to allow the insects to fall from the device, that is, when it is turned over, as will be clearly manifest.

As clearly shown in the drawings, the device has a plurality of entrances or mouths arranged between the upper and lower plates, and which connect the two together.

Having thus described the invention, what is claimed as new and useful is,

A device of the class described, having upper and lower plates, a wire netting forming the sides thereof and having a plurality of entrances, a removable core mounted in th ecenter of said device, said upper plate being pyramidal or funnel-shaped for the purpose of conveniently dumping the insects out by inverting the device.

In testimony whereof I hereunto affix my signature in presence of two witnesses.

JAMES E. DE HAAS.

Witnesses:
 GEO. A. KENNEDY,
 GEORGE P. RUSH.